United States Patent [19]
Co et al.

[11] Patent Number: 5,459,753
[45] Date of Patent: Oct. 17, 1995

[54] METHOD AND APPARATUS FOR PATTERN INDEPENDENT PHASE DETECTION AND TIMING RECOVERY

[75] Inventors: Ramon S. Co, Milpitas; Ron Kao, San Jose, both of Calif.

[73] Assignee: 3Com Corporation, Santa Clara, Calif.

[21] Appl. No.: 880,172

[22] Filed: May 6, 1992

[51] Int. Cl.⁶ .................... H04L 7/04; H04L 7/00
[52] U.S. Cl. ........................... 375/362; 375/371
[58] Field of Search .................. 375/111, 118, 375/113, 117, 119; 328/133, 155; 370/108, 105.3, 100.1; 307/269, 262

[56] References Cited

U.S. PATENT DOCUMENTS

| | | |
|---|---|---|
| 3,980,826 | 9/1976 | Widmer ...................... 375/36 |
| 4,119,796 | 10/1978 | Jones ........................ 375/118 |
| 5,313,501 | 5/1994 | Thacker ..................... 375/118 |

Primary Examiner—Stephen Chin
Assistant Examiner—Huong Lou
Attorney, Agent, or Firm—Benman Collins & Sawyer

[57] ABSTRACT

A timing recovery scheme disposed to be substantially invariant to the specific composition of an input data sequence. The phase detection network of the present invention will typically be addressed by a data waveform having a plurality of data packets separated by data delimiters. In operation, the phase detection network of the present invention generates a phase error signal in response to the phase difference between a binary data waveform and a periodic clock waveform recovered therefrom. The inventive phase detection network includes a shift register for storing samples of the incident data waveform. The contents of the shift register are monitored by a boundary detection circuit disposed to signal the presence of one of the delimiters within the shift register. Upon detection of such a delimiter a boundary correction circuit is disposed to generate a phase detection enable signal. The inventive phase detection network further includes a phase detector which is operative, upon being enabled by the boundary correction circuit, to compare the relative phase between the data and clock waveforms in order to synthesize the phase error signal.

32 Claims, 9 Drawing Sheets

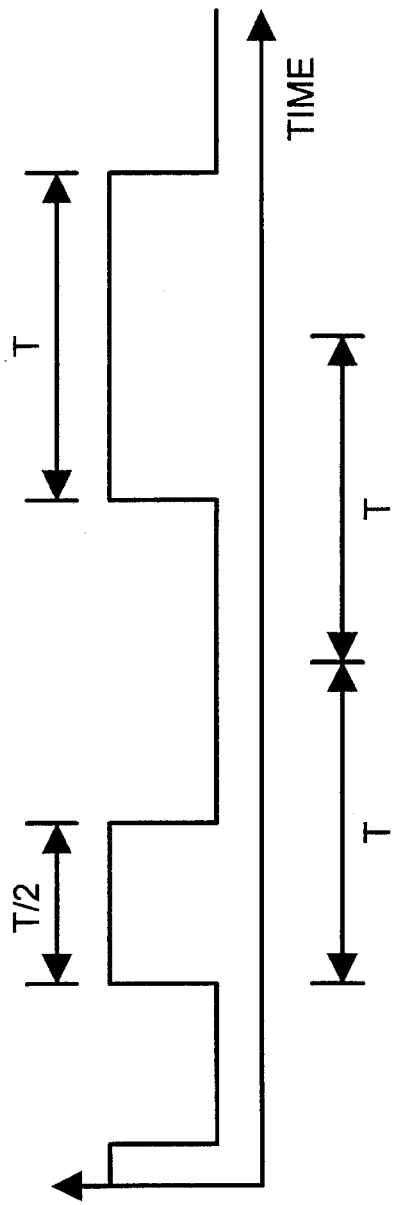
FIG. 1A INPUT DATA
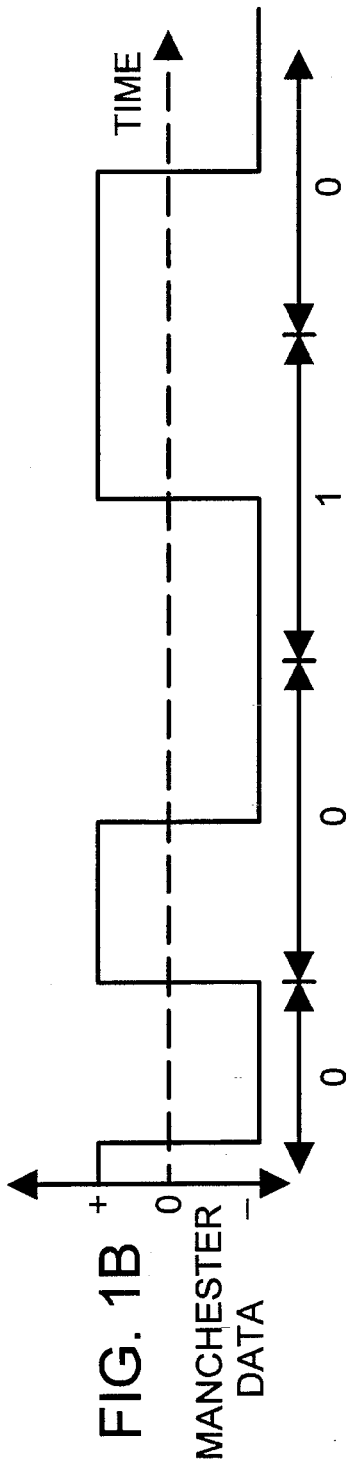
FIG. 1B MANCHESTER DATA
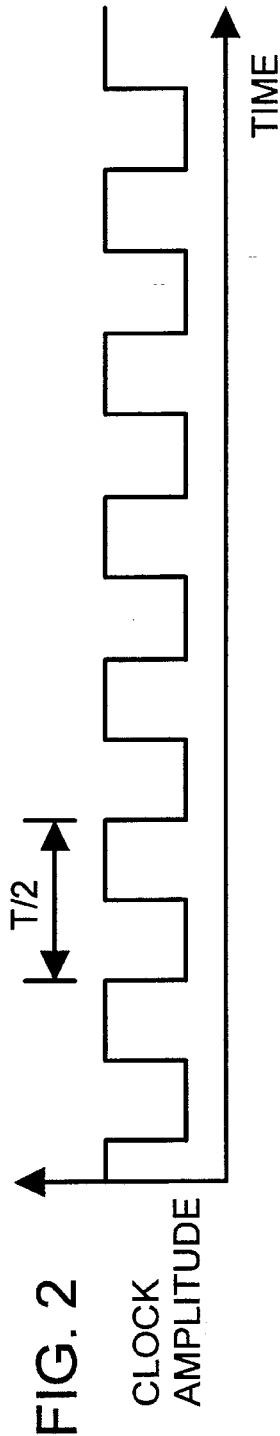
FIG. 2 CLOCK AMPLITUDE

METHOD AND APPARATUS FOR PATTERN INDEPENDENT PHASE DETECTION AND TIMING RECOVERY

BACKGROUND OF THE INVENTION

1. Field of the Invention

The present invention relates to the recovery of clock timing information from data transmitted within digital systems. More specifically, this invention relates to phase-locked methods of clock recovery within digital systems such as local area networks (LANs).

While the present invention is described herein with reference to a particular embodiment, it is understood that the invention is not limited thereto. Those having ordinary skill in the art and access to the teachings provided herein will recognize additional embodiments within the scope thereof.

2. Description of the Related Art

The interest in local-area networks is steadily increasing. Local area networks facilitate economical data communication between computing systems clustered in a locality. One such network widely used in the art is known as a token ring LAN.

A token ring LAN is a circular network having a plurality of stations (nodes) interconnected in a ring topology. Access to the network is controlled by the possession of a signal "token". The token is a packet of signals that is passed from node to node. The node that has the token has control of the network with respect to the transmission of data to other nodes and the receipt of data from the same. When the node has completed a transmission, the token is released for acquisition by another node.

Errors in data transmission within the ring can generally be minimized by operating the ring in a synchronous mode. That is, in order to decode a baseband data waveform a clock signal giving the proper sampling time must be available. Pilot tones are sometimes transmitted along with the data waveform for this purpose. Alternatively, timing may be derived directly from the data waveform itself. One approach to such "self-timing" involves allowing the data to pass through a memoryless nonlinearity and then ring a tuned circuit with a resonant frequency close to the nominal data (bit) rate. Nonetheless, this approach is relatively imprecise in comparison with those which utilize phase-locked loops (PLL's).

Conventional PLL's generally include a phase/frequency detector (PFD) for generating an error signal in response to the phase difference between an input data stream and a recovered clock signal. A charge pump and associated filter network usually accompany the PFD in order to convert the logic states thereof into analog signals suitable for controlling a voltage controlled oscillator (VCO). The VCO, in turn, produces the recovered clock signal.

The efficacy of PLL's employed in LAN's with regard to the extraction of a clock frequency from a data waveform generally depends largely on the performance characteristics of the PFD, as well as on the transmission code selected. In this regard, the Manchester code is often favored within LAN's as allowing for relatively simple clock extraction since a rising or falling data transition occurs at every midbit interval irrespective of the specific data pattern. Despite the numerous possible realizations of the PFD, however, nearly all are disposed to produce an error signal only upon the occurrence of data transitions in a single direction. For example, "rising edge" phase detectors will perform a phase comparison and issue an error signal only with regard to data bits which include a rising transition. Accordingly, even in systems utilizing Manchester coding an error correction signal will not be produced by the PFD every clock period.

There exist at least two disadvantages resulting from the failure to generate an error signal during each clock period. First, the recovered clock signal may undergo an unacceptably large drift in phase during the interval between successive correction signals. Second, the loop gain of the PLL will fluctuate depending on the density of rising and falling transitions within the data waveform. It follows that a data pattern having a high density of, for instance, rising edge transitions will induce a rising edge phase detector to inject a relatively large number of correction signals into the PLL. The resulting increase in gain within the PLL is thus seen to be a function of the stimulus of the data pattern. Unfortunately, variations in loop gain due to data pattern differences may be magnified between chain-connected PLL's so as to introduce undesired effects such as timing jitter accumulation.

Accordingly, a need in the art exists for a PLL timing recovery scheme in which loop performance is substantially unaffected by the specific composition of the incident data waveform.

SUMMARY OF THE INVENTION

The need in the art for a digital timing recovery scheme disposed to be substantially invariant to the specific composition of an input data sequence is addressed by the pattern independent phase detection network of the present invention. The inventive phase detection network will typically be addressed by a data waveform having a plurality of data packets separated by data delimiters. In operation, the phase detection network of the present invention generates a phase error signal in response to the phase difference between a binary data waveform and a periodic clock waveform recovered therefrom.

The inventive phase detection network includes a shift register for storing samples of the incident data waveform. The contents of the shift register are monitored by a boundary detection circuit disposed to signal the presence of one of the delimiters within the shift register. Upon detection of such a delimiter, a boundary correction circuit is disposed to generate a phase detection enable signal. The inventive phase detection network further includes a phase detector which is operative, upon being enabled by the boundary correction circuit, to compare the relative phase between the data and clock waveforms in order to synthesize the phase error signal.

BRIEF DESCRIPTION OF THE DRAWINGS

FIG. 1a depicts a binary encoded waveform which includes a sequence of short and long pulses.

FIG. 1b shows the Manchester representation of the encoded waveform of FIG. 1a.

FIG. 2 illustrates a clock waveform recovered from the Manchester data depicted in FIG. 1b.

DETAILED DESCRIPTION OF THE INVENTION

FIG. 1a depicts a binary encoded waveform which includes a sequence of short and long pulses. The long pulses may be considered to have a pulse width of T and the short pulses a pulse width of T/2, where T corresponds to the bit period. The waveform of the system clock at twice the bit rate is illustratively represented in FIG. 1b.

The information included within the pulse sequence of FIG. 1a may be represented by a number of code assignments, including that commonly referred to as Manchester code. For example, a binary 1 is typically represented in conventional Manchester code by a rising transition in the middle of the bit period. Similarly, a binary 0 admits to a Manchester representation characterized by a falling transition in the middle of the bit period.

FIG. 1b shows the Manchester representation of the encoded waveform of FIG. 1a. As shown in FIG. 1b, the Manchester representation of each binary numeral crosses zero at the center of each data bit. As described hereinafter, the timing recovery scheme of the present invention may be employed to exploit this characteristic of Manchester code in order to recover the clock signal illustratively represented in FIG. 2 from the Manchester data pattern of FIG. 1b. More specifically, the technique of the present invention contemplates monitoring the input Manchester waveform for the presence of a standard data delimiter interspersed between sequences of valid Manchester code. Upon recognition of such a delimiter a phase detection network may be appropriately synchronized so as to provide a correction signal at each midbit data transition. In this manner, the present invention is adapted to overcome the aforementioned shortcomings of conventional timing recovery schemes.

More specifically, the present invention operates in a manner which substantially prevents phase drift of the recovered clock between intermittently generated correction signals. As was discussed in the Background of the Invention, the phase detectors employed in conventional clock recovery circuits generally operate exclusively upon either the rising or falling data transitions within an incident data stream. The present invention is thus disposed to prevent the deviation in phase between the recovered clock and the Manchester encoded data potentially accruing from this intermittent generation of phase error signals.

Figure 3:
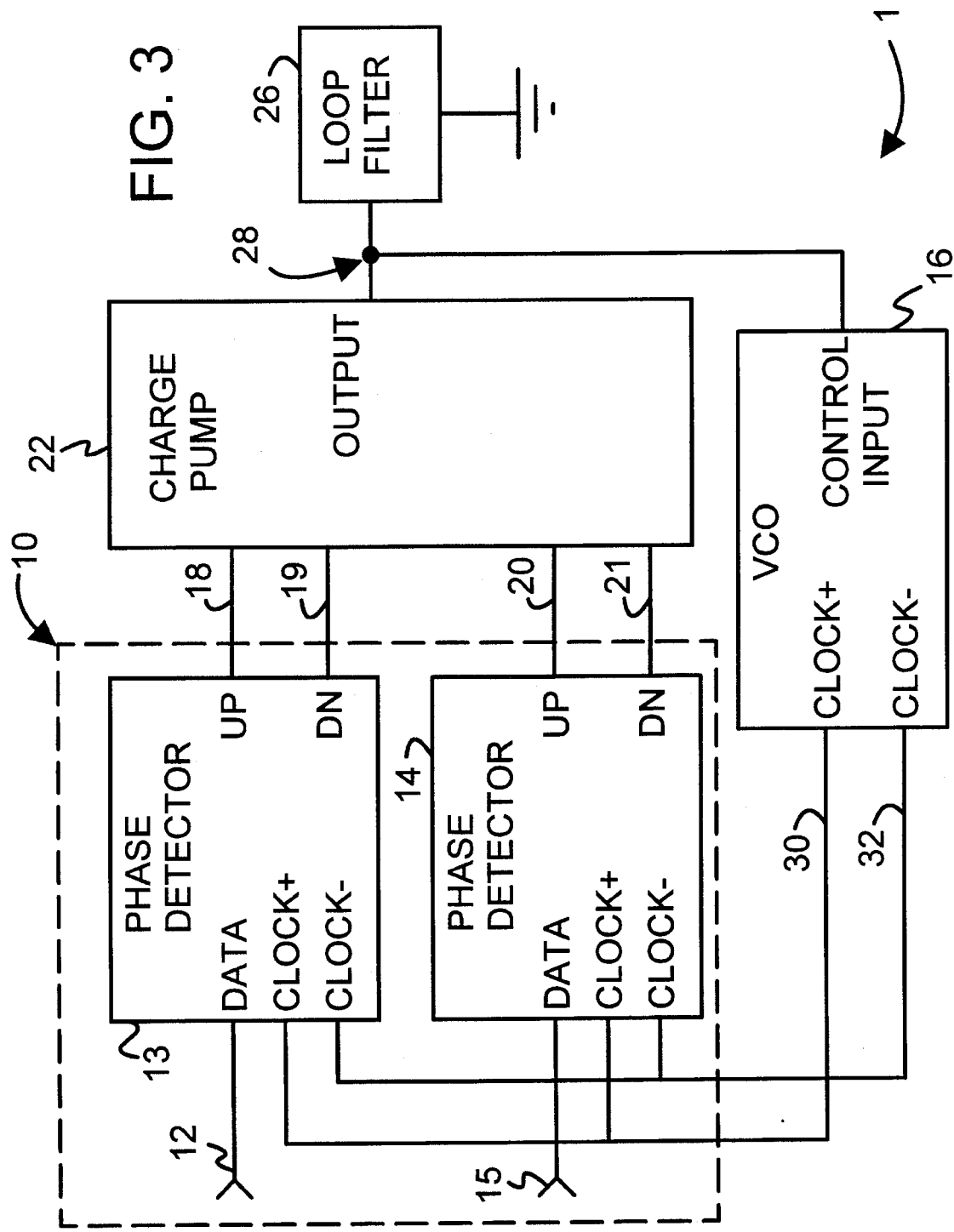
FIG. 3 shows a block diagram of a phase locked loop (PLL) which includes a preferred embodiment of the pattern independent phase detection network of the present invention.

FIG. 3 shows a block diagram of a phase locked loop (PLL) 1 which includes a preferred embodiment of the pattern independent phase detection network 10 of the present invention. As shown in FIG. 3, the inventive phase detection network 10 is addressed by a differential Manchester encoded data waveform impressed across first and second input terminals 12 and 15 of first and second detection modules 13 and 14, respectively. The detection network 10 is operative to generate a phase error signal in response to the phase difference between the differential input waveform and a recovered clock from a voltage controlled oscillator (VCO) 16.

As is shown in FIG. 3, the phase error signal includes a pair of components from each of the detection modules 13 and 14. Specifically, first UP and DOWN components generated by the module 13 are impressed on first and second signal lines 18 and 19. Similarly, second UP and DOWN components of the phase error signal are transmitted via third and fourth signal lines 20 and 21. The UP and DOWN components of the phase error signal each include a sequence of square pulses and control the operation of a charge pump circuit 22. The pump circuit 22 and associated loop filter 26 are designed to convert the logical UP and DOWN waveforms into analog signals suitable for controlling the VCO 16. The pump circuit 22 is generally designed to deliver either a pump voltage or pump current to the loop filter 26 in order to create the control voltage. The loop filter 26 may be conventionally realized with similar flexibility using either active or passive circuit elements. (See, for example, Gardner, F. M.; "Charge-Pump Phase-Lock Loops"; IEEE Transactions on Communications, vol. com-28, no. 11, November 1980). As shown in FIG. 3, the control voltage created by the pump circuit 22 and filter 26 is impressed on a control terminal 28 in communication with the VCO 16.

Referring to FIG. 3, the recovered clock waveform synthesized by the VCO 16 is transmitted to the first and second detection modules within the inventive phase detection network 10 by a clock line 30. At the commencement of operation of the PLL, the frequency of the recovered clock is initialized to that of a local crystal oscillator (not shown) having a natural frequency of preferably twice the anticipated bit rate of the input Manchester data. Accordingly, the clock line 30 initially triggers the inventive network 10 to conduct phase comparisons between the recovered clock and the input Manchester code at twice the expected bit rate. The VCO 16 also supplies the logical complement of the clock waveform to the first and second detection modules 13 and 14 within the network 10 by way of a complementary clock line 32.

Figure 4:
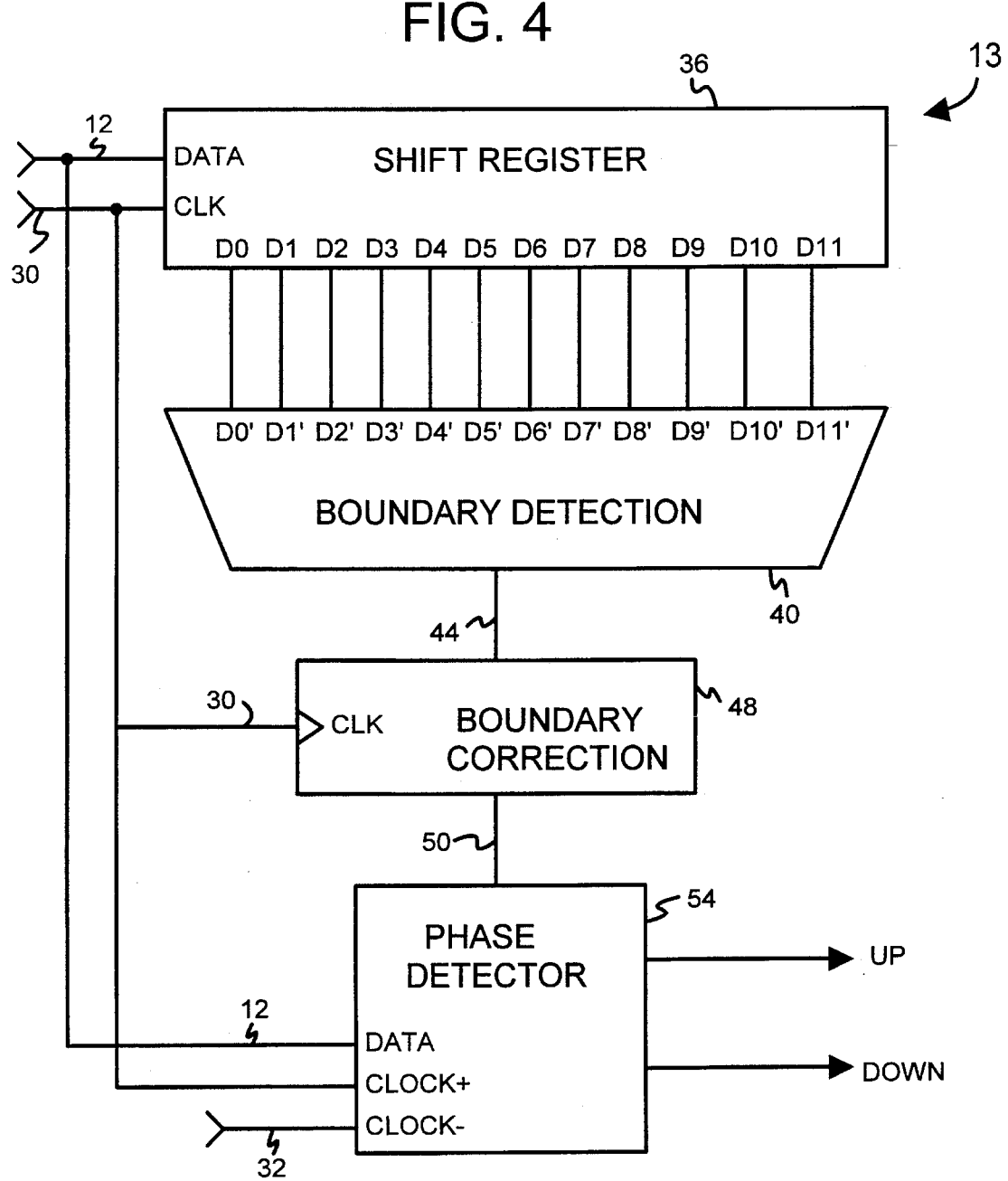
FIG. 4 shows a more detailed block diagram of the first detection module included within the pattern independent phase detection network of the present invention.

FIG. 4 shows a more detailed block diagram of the first detection module 13 included within the pattern independent phase detection network 10 of the present invention. Again, the Manchester encoded data waveform is input on the terminal 12. The terminal 12 is in communication with an input port of a data shift register 36. In the embodiment of FIG. 4 the shift register 36 includes twelve data registers D0, D1, D2, D3, D4, D5, D6, D7, D8, D9, D10 and D11 for sequentially storing twelve samples of the input Manchester data. During each clock cycle the input data value impressed on the terminal 12 is stored in the first register D0. The data values stored in the remaining registers are contemporaneously shifted to the adjacent register on the right, with the data in register D11 being overwritten by that in register D10.

As was mentioned above, the present invention is disposed to monitor the input Manchester data for the presence of a delimiter embedded between sequences of valid Manchester code. In the embodiment of FIG. 4 such a monitoring process is effected by a boundary detection circuit 40 in communication with the shift register 36. Again with reference to FIG. 4, the detection circuit 40 includes twelve monitoring ports D0', D1', D2', D3', D4', D5', D6', D7', D8', D9', D10' and D11' in communication with the data registers D0, D1, D2, D3, D4, D5, D6, D7, D8, D9, D10 and D11, respectively. Again, each of the data registers within the shift register holds a sample of the input Manchester code. Since two samples of the input code are taken by the shift register 36 during each bit period, the twelve data registers store data from six bits of the input Manchester code. As Manchester code only includes two amplitude levels and transitions between these levels at the middle of each data bit, a two-sample representation of a new Manchester data bit will be stored in the first and second register D0 and D1 during every other cycle of the recovered clock. It follows that if transitions in the input Manchester code corresponding to the boundary between adjacent data bits may be distinguished from midbit data transitions, the bit timing and input code may be correctly synchronized in phase.

The boundary detection circuit 40 operates to ascertain the correct boundaries of the Manchester code stored within the shift register 36 by logically comparing the values in adjacent data registers so as to detect the presence of a data delimiter within the register 36. The detection circuit 40 will preferably be designed to detect the presence of, for example, the Manchester delimiter JK0JK0. This delimiter is specified by IEEE standard 802.5 and is often employed within local area network communication systems. It is observed that a Manchester "J" is characterized by the lack of an amplitude transition at the beginning and middle of the data bit, while the Manchester "K" corresponds to the logical complement of the Manchester "J". It follows that the contents of the data registers within the shift register 36 will be related as set forth below upon storage of the Manchester delimiter JKMJKM therein:

D11=D10, D9=D8, D9=D10*, D6=D7*, D5=D4, D3=D2, D3=D4*, and D0=D1* with * denoting the logical complement and "M" corresponding to a two-sample representation of a Manchester one or zero. Upon recognizing the existence of the above condition the boundary detection circuit 40 pulses a boundary detection line 44.

The detection circuit 40 is also adapted to recognize the presence of a valid Manchester data sequence MMMMMM within the shift register 36. The contents of the data registers within the shift register 36 will be related, in the following manner, with a six bit Manchester data word MMMMMM present therein:

D0=D1*, D2=D3*, D4=D5*, D6=D7*, D8=D9* and D10=D11*, with * denoting the logical complement. Again, the boundary detection circuit 40 pulses the boundary detection line 44 upon identification of a valid Manchester data sequence MMMMMM within the shift register 36. The boundary detection circuit will preferably be designed so as not to pulse the detection line 44 upon storage of the "all zero" Manchester data words 010101010101, or 101010101010 in the shift register 36. Each of the all zero data words include transitions at every bit boundary as well as at the middle of each bit. It follows that midbit transitions are not conveniently distinguishable from those at the boundary of each bit, thus necessitating that the boundary detection circuit 40 be inhibited from pulsing the detection line 44 upon detection of the all zero condition.

As shown in FIG. 4, the boundary detection line 44 addresses a boundary correction circuit 48. The correction circuit 48 is also addressed by the clock line 30, and operates to transmit a phase detection enable signal on a phase detector enable line 50 upon pulsing of the detection line 44. The phase detection enable signal consists of a sequence of square pulses, with each pulse being of a duration substantially equivalent to the period of the recovered clock waveform present on the clock line 30.

Again with reference to FIG. 4, the phase detection enable signal is transmitted to a phase detector 54 via the enable line 50. The phase detector 54 is addressed by the clock and complementary clock lines 30 and 32, and is also driven by the input Manchester waveform impressed on the input terminal 12. When actuated by the phase detection enable signal the phase detector 54 generates the first UP and first DOWN signals in response to the phase difference between the input Manchester data and the recovered clock signal present on the clock line 30.

Figure 5:
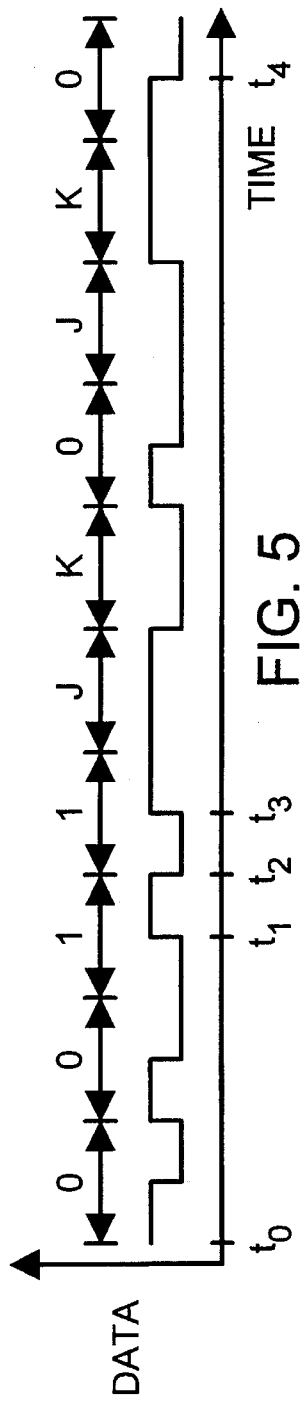
FIG. 5 is a timing diagram depicting an input sequence of Manchester data impressed on the input terminal of the inventive phase detection network.
Figure 6:
FIG. 6 illustrates as a function of time the recovered clock waveform impressed on a clock line.
Figure 7:
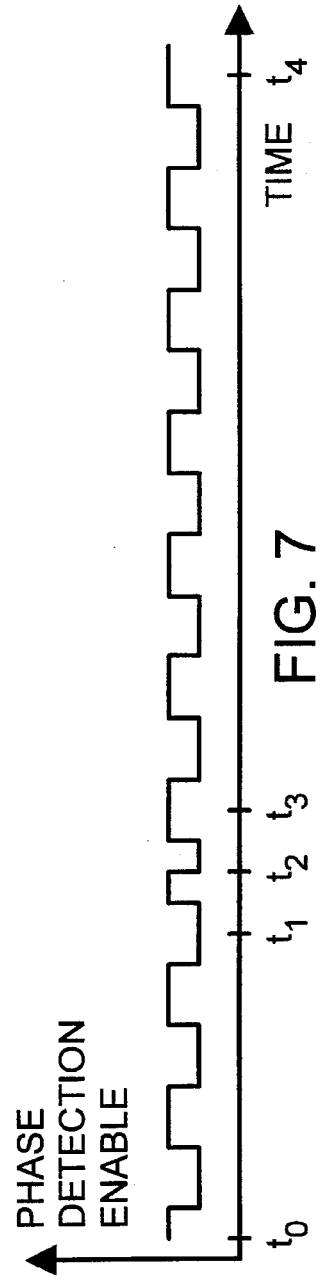
FIG. 7 shows a representation of the phase detection enable signal generated by a boundary correction circuit.
Figure 8:
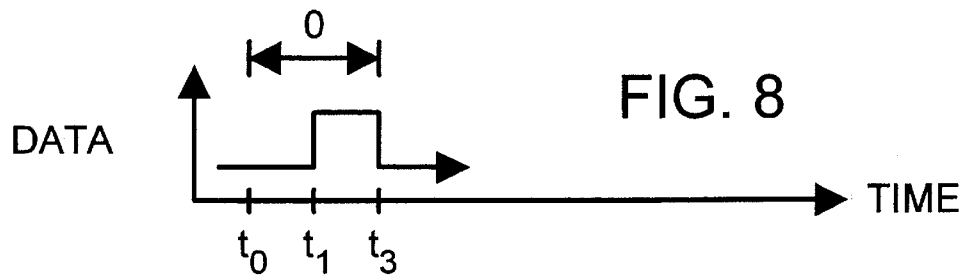
FIG. 8 is a timing diagram which shows a Manchester "0" impressed on the input terminal of the inventive phase detection network.

The operation of the present invention may be more fully appreciated by reference to FIGS. 5, 6 and 7. Specifically, FIG. 5 is a timing diagram depicting an input sequence of Manchester data impressed on the input terminal 12. In addition, FIG. 6 illustrates the recovered clock waveform impressed on the clock line 30 as a function of time. In a similar manner, FIG. 7 shows the associated waveform corresponding to the phase detection enable signal generated by the boundary correction circuit 48. It is noted that the phase detection signal is deliberately depicted at time $t_0$ as differing in phase by one-hundred eighty degrees with respect to the input data waveform. As will be apparent from the following, this relationship is shown in order to illustrate the correction features of the present invention. Again, the desired phase relationship consists of the logically high portions of the phase detection enable signal being centered on the midbit transitions of the data waveform.

Referring to FIG. 5, prior to time $t_1$ the input data waveform consists exclusively of Manchester zeroes. Accordingly, prior to time $t_1$, the boundary detection line 44 is not pulsed by the boundary detection circuit 40. Upon detection of the nonzero Manchester transition at time $t_2$, the boundary detection line 44 is pulsed and the status of the phase detection enable signal (FIG. 7) is interrogated by the boundary correction circuit 48. Since the phase detection enable signal is inappropriately at a logical high at time $t_2$ (i.e. phase detection enable should be low during midbit transition between $t_1$ and $t_2$), the phase detection enable signal is set high at the midbit transition following time $t_2$. During the subsequent clock cycle the phase detection enable signal is set low by the boundary correction circuit 48, thus being appropriately at a logical low during the bit boundary transition occurring at time $t_3$. At time $t_4$ the boundary detection line 44 is pulsed upon the loading of the JK0JK0 sequence depicted in FIG. 5 into the shift register 36. However, the phase detection enable signal is in the appropriate phase relationship relative to the input data sequence at time $t_4$, and hence a boundary correction operation is not required to be performed.

Figure 9:
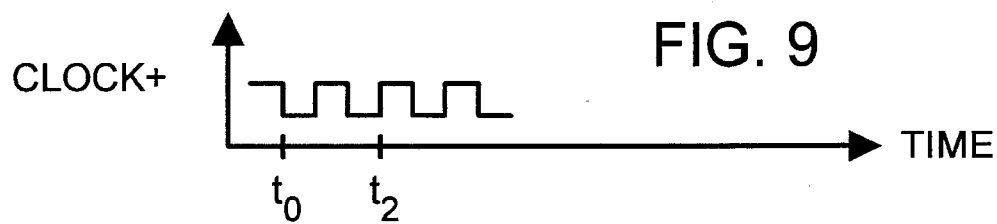
FIGS. 9 and 10 illustratively represent the recovered clock and complementary clock waveforms impressed on the clock and complementary clock lines, respectively.
Figure 10:
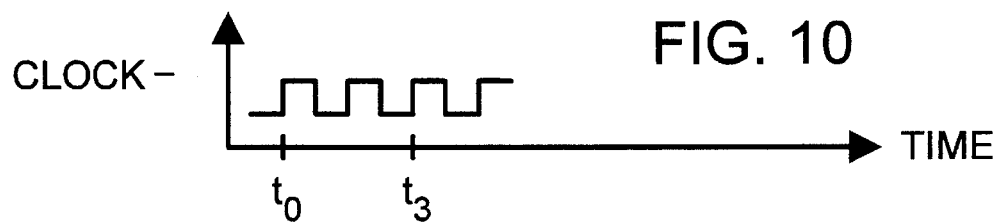
Figure 11:
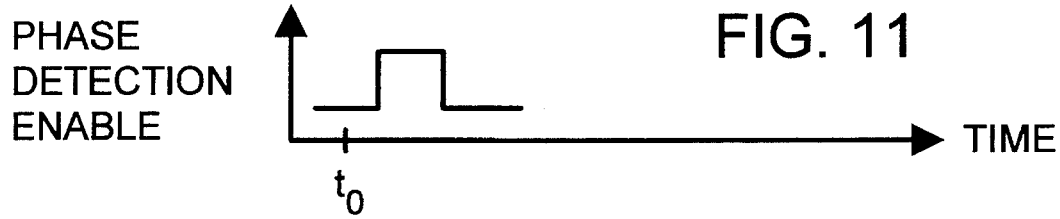
FIG. 11 depicts the waveform corresponding to the phase detection enable signal generated by a boundary correction circuit.
Figure 12:
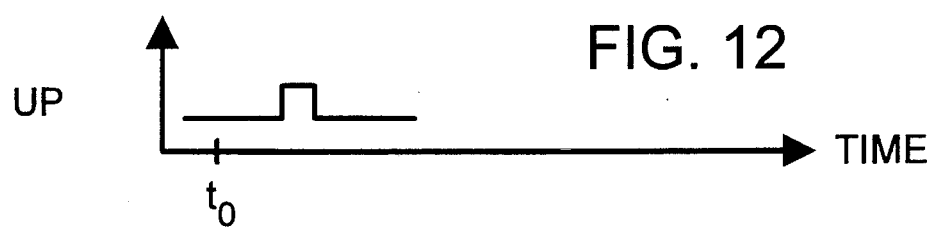
FIGS. 12 and 13 are timing diagrams which provide a representation of the UP and DOWN pulses issued by the phase detector in response to the relative alignment of selected transitions in the data and clock waveforms.
Figure 13:

FIGS. 8, 9, 10, 11, 12 and 13 are timing diagrams which illustrate the specific manner in which the phase detector 54 is operative to generate the first UP and DOWN signals on the first and second signal lines 18 and 19. In particular, to be impressed on input terminal 12 is a Manchester data waveform with rising midbit transition shown in FIG. 8. In a similar manner, FIGS. 9 and 10 illustratively represent the recovered clock and complementary clock waveforms impressed on the clock and complementary clock lines 30 and 32. Again, FIG. 11 depicts the waveform corresponding to the phase detection enable signal generated by the boundary correction circuit 48. Finally, FIGS. 12 and 13 are timing diagrams which provide a representation of the UP and DOWN pulses issued by the phase detector 54. As is discussed below, the width of the UP and DOWN pulses is determined by the relative alignment of the indicated transitions in the data and clock waveforms of FIGS. 8 and 9, respectively.

The timing diagrams of FIGS. 8 through 13 correspond to operation of the PLL 1 in the desired phase-locked condition. Namely, the falling transitions of the clock waveform (FIG. 9) coincide with the edges of the bit boundary at times $t_0$ and $t_3$, and the phase detection enable signal is appropriately centered about the midbit transition occurring at time $t_1$. As shown in FIG. 11, the UP signal is created during the interval when the phase detector 54 is actuated in response to the high logical state of the phase detection enable signal. In particular, the pulse width of the UP signal is defined by the rising data transition at time $t_1$ and the rising clock transition at time $t_2$. The DOWN is created in response to the rising clock transition at time $t_2$ and the rising complementary clock transition at time $t_3$. As is suggested by the preceeding discussion, the duration of the UP signal exceeds that of the DOWN signal if the midbit transition of the data signal leads the associated transition in the clock signal. Conversely, the UP signal is narrower than the DOWN signal in the event that midbit data transition lags the clock signal. Again, the UP and DOWN signals are processed by the charge pump 22 in a conventional manner in order to generate the VCO control voltage at the control terminal 28.

The second detection module 14 is designed to be substantially identical to the first detection module 13. Accordingly, the second detection module 14 operates to generate the second UP and DOWN signals in response to the complement of the input data waveform in a manner substantially identical to that described above with reference to first detection module 13. In the preferred embodiment of FIG. 4, the phase detector 54 and an identical phase detector included within the second module 14 are adapted to be sensitive only to rising edges within the clock and complementary clock waveforms. Since only either the data waveform or complement thereof will include a rising midbit transition during each bit period, UP and DOWN signals will never simultaneously be issued by the detection modules 13 and 14.

In a similar manner, the phase detector 54 and the corresponding phase detector within the second detection module 14 are configured to utilize only the rising edges of the clock and complementary clock waveforms in synthesizing the UP and DOWN signals. This feature of the present invention prevents the differences in rise and fall times associated with digital circuit elements from influencing the duration of the UP and DOWN signals. In this manner, the present invention provides a timing recovery scheme substantially immune from signal distortion due to deviations in performance among digital circuits.

Figure 14:
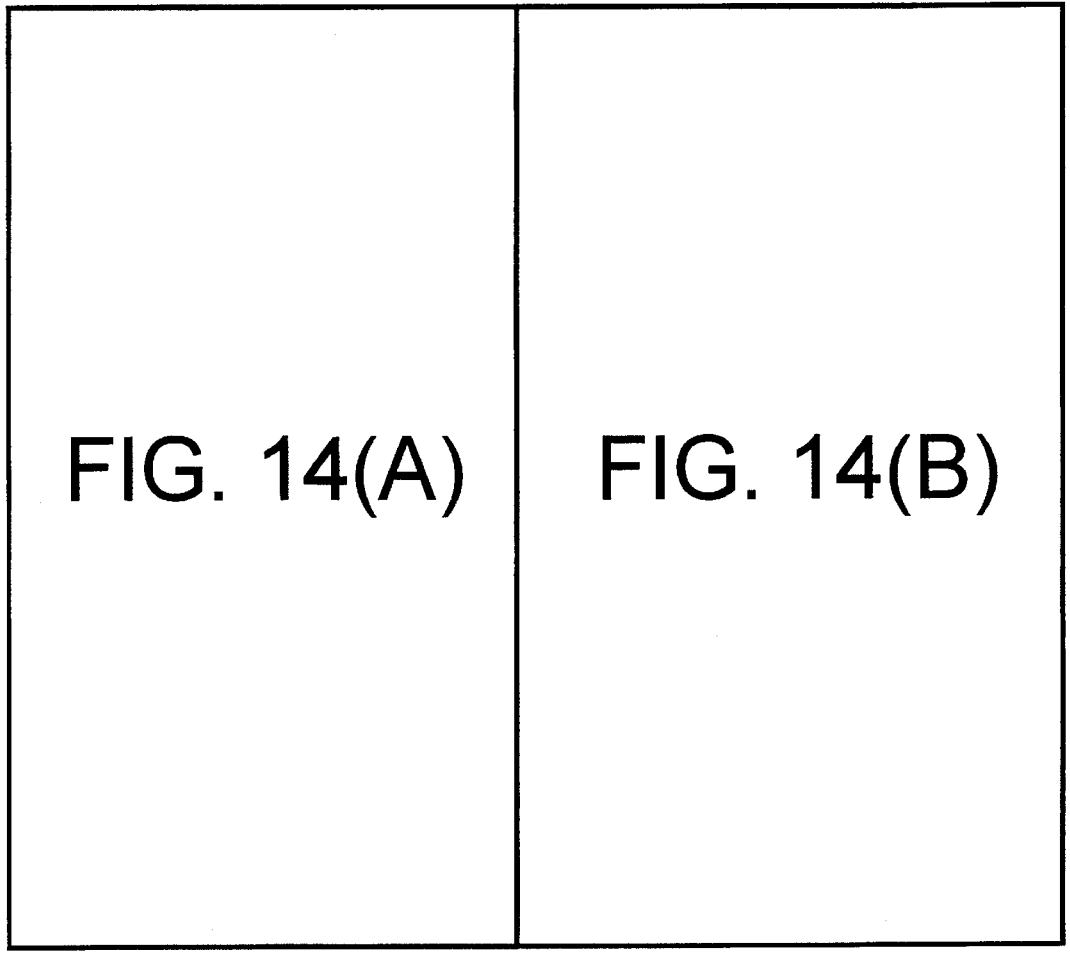
FIG. 14 consists of FIGS. 14A–14B shows a schematic representation of the shift register and boundary detection circuit.
Figure 14A:
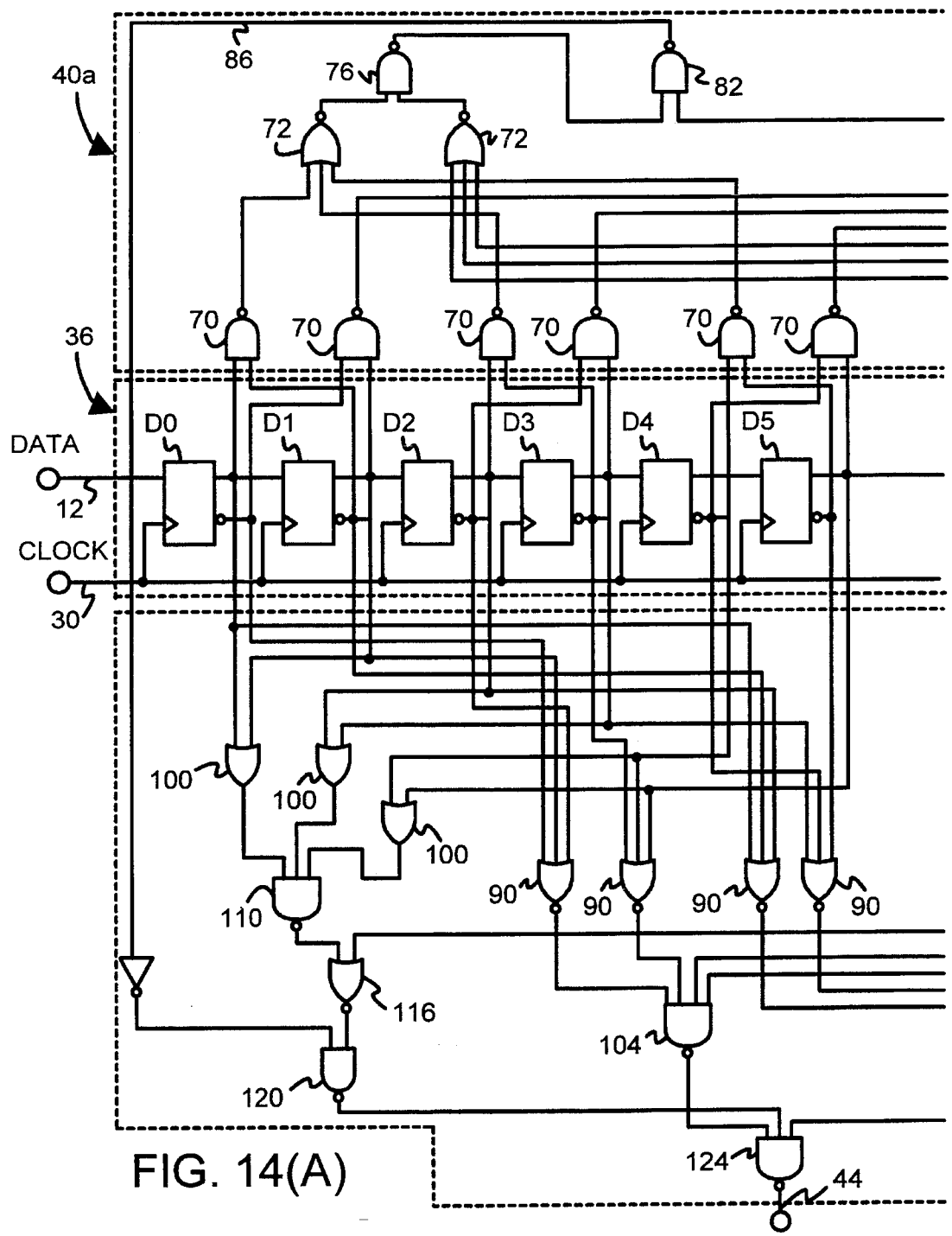
Figure 14B:
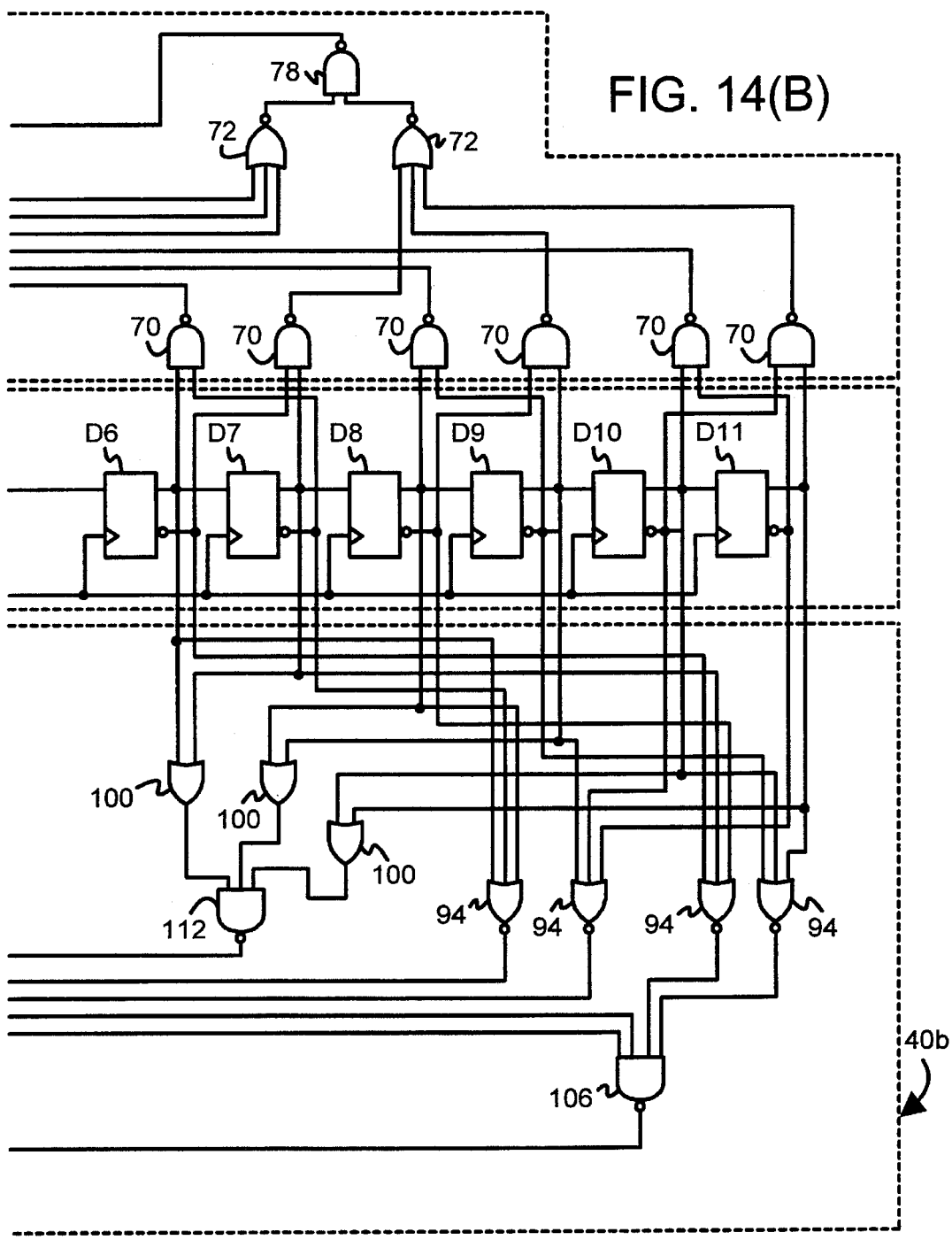

FIG. 14 shows a schematic representation of the shift register 36 and boundary detection circuit 40. As shown in FIG. 14, the input terminal 12 is in communication with a D-type sampling flip-flop which serves as the first data register D0. The remaining data registers D1 through D11 consist of a substantially identical set of chain connected flip-flops. As is indicated by FIG. 14, the clock port of each flip-flop within the data register 36 is driven by the clock line 30.

As mentioned above, the boundary detection circuit 40 is disposed to monitor the data register 36 for the presence of either the Manchester delimiter JK0JK0 or a valid Manchester sequence MMMMMM. Again, however, in the latter "all zero" case the boundary detection circuit 40 will be inhibited from pulsing the boundary detection line 44 upon the loading of either 101010101010 or 010101010101 within the data register 36.

As shown in FIG. 14, the boundary detection circuit 40 may be realized by the digital networks included within first and second circuit blocks 40a and 40b. Specifically, the first block 40a includes digital logic for detecting the all zero exception to a valid Manchester sequence MMMMMM. The first block 40a includes a first set of NAND gates 70 driven as shown by the Q and complementary Q outputs of successive flip-flops within the data register 36. The output nodes of the NAND gates 70 each address one of a first set of four three-input NOR gates 72. Two of the NOR gates 72 are connected to a primary NAND gate 76 while the remaining two NOR gates 72 address a secondary NAND gate 78. As shown in FIG. 14, the primary and secondary NAND gates 76 and 78 feed a tertiary NAND gate 82. In this manner, the tertiary NAND gate 82 supplies an inhibit signal on an all zero line 86 upon detection of the aforementioned all zero condition. The inhibit signal prevents raising of the boundary detection line 44 in response to loading of an all zero data pattern within the shift register 36.

The second circuit block 40b includes a digital network for detecting the Manchester delimiter JK0JK0 or MMMMMM sequence within the shift register 36. In particular, the second circuit block 40b includes second and third sets of NOR gates 90 and 94 in communication with the Q and complementary Q outputs of flip-flops within the shift register 36. Further included are a plurality of exclusive OR gates 100 similarly connected to the shift register 36. As shown in FIG. 14, the second and third sets of NOR gates 90 and 94 drive first and second four-input NAND gates 104 and 106. The logical output of the NAND gates 104 and 106 reflects whether the delimiter JK0JK0 has been loaded into the register 36. In like manner, the exclusive OR gates 100 are in communication with first and second three-input NAND gates 110 and 112. The outputs of the three-input NAND gates 110 and 112 are processed by a two-input NOR gate 116. The two-input NOR gate 116, along with the complement of the signal on the inhibit line 86, drive a first two-input NAND gate 120. Accordingly, one logical state of the two-input NAND gate 120 corresponds to the presence of a valid Manchester MMMMMM sequence within the shift register 36 (except the all zero sequence), while the complementary state indicates either the all zero condition or the absence of a valid Manchester sequence therein. Finally, the boundary detection line 44 interfaces with the second circuit block 40b through an output NAND gate 124. The output NAND gate 124 is driven by the first and second four-input NAND gates 104 and 106 and by the two-input NAND gate 120.

Figures 15, 16:
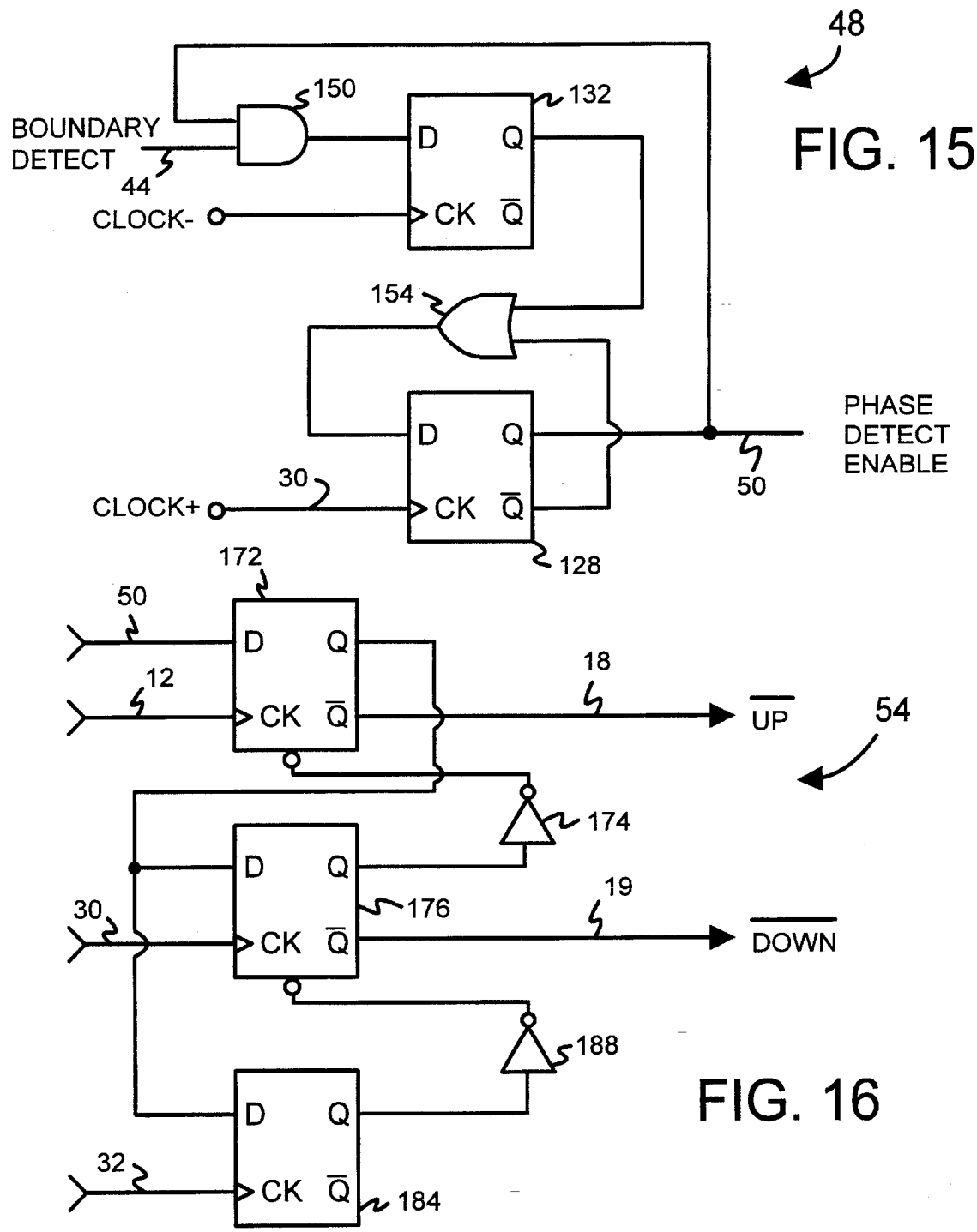
FIG. 15 shows a schematic representation of the boundary correction circuit included within the phase detection network of the present invention.
FIG. 16 is a schematic diagram providing a detailed view of a phase detector included within a preferred embodiment of the present invention.

FIG. 15 shows a schematic representation of the boundary correction circuit 48. A first clocked D-type flip-flop 128 included within the correction circuit 48 is addressed by the clock line 30. The flip-flop 128 is operative to divide the clock signal by two when the Q output of a second D-type flip-flop 132 is driven low. As shown in FIG. 15, the timing of the second D-type flip-flop 132 is controlled by the complementary clock waveform. The D-input of the second flip-flop 132 is driven by an AND gate 150 addressed by the boundary select line 44 and phase detection enable line 50. In the phase-locked condition the phase detection enable line 50 will be low when the boundary detection line 44 is pulsed high. Accordingly, when the phase detection enable and boundary select signals are contemporaneously raised to a logical high the boundary correction circuit 48 is disposed to appropriately adjust the phase of the latter. In particular, the circuit 48 operates to force the output of OR gate 150 to a logical high for two consecutive clock cycles following detection of the incorrect phase relationship. The Q output of flip-flop 128 then resumes alternating between high and low states during successive clock cycles.

A detailed view of the phase detector 54 is given by the schematic diagram of FIG. 16. As shown in FIG. 16, the phase detector 54 includes a primary input D-type flip-flop 172 having a D input addressed by the detection enable line 50. The clock port of the primary input flip-flop 172 is in communication with the Manchester data waveform impressed on the input terminal 12. In addition, the reset terminal of the primary flip-flop 172 is connected to a primary inverter 174. As is indicated in FIG. 16, the complementary Q output of the primary flip-flop 172 supplies the first UP signal to the first signal line 18. In like manner, the Q output of the primary flip-flop 172 is coupled to the D input of a first clocked flip-flop 176. The first clocked flip-flop 176 is also driven by the clock waveform present on the clock line 30. As is indicated by FIG. 16, the complementary Q output of the first clocked flip-flop 176 provides the first DOWN signal on the second signal line 19. In addition, the Q output of the first clocked flip-flop 176 is connected to the input of the primary inverter 174, while the complementary clock line 32 is coupled to the clock port of a second clocked flip-flop 184. The Q output of the second clocked flip-flop 184 is coupled to a secondary inverter 188, with the latter being in communication with the reset terminal of the first clocked flip-flop 176.

While the present invention has been described herein with reference to a particular embodiment, it is understood that the invention is not limited thereto. The teachings of this invention may be utilized by one having ordinary skill in the art to make modifications within the scope thereof. For example, in alternative embodiments of the present invention it may be desired to utilize logical networks other than those disclosed herein in realizing the boundary detection and correction circuits. Similarly, rather than send the data waveform and complement thereof to the first and second detection modules, respectively, the same data waveform could be sent to both after modifying the second detection module to be responsive to falling edge data transitions. The invention is similarly not limited to the specific Manchester data delimiters described herein. The logic within the boundary detection circuit may be altered to recognize the presence of other data delimiters or data sequences.

It is therefore contemplated by the appended claims to cover any and all such modifications.

Accordingly,

What is claimed is:

1. A pattern independent phase detection network for generating a phase error signal in response to a phase difference between a binary data waveform and a periodic clock waveform recovered from the binary data waveform, said data waveform having a plurality of data packets each separated by a data delimiter, said pattern independent phase detection network comprising:

storage means for storing samples of said data waveform;

boundary correction means for generating a phase detection enable signal in response to said delimiter within said storage means; and phase detector means for comparing a relative phase between said data waveform and said periodic clock waveform upon generating said phase detection enable signal and for synthesizing said phase error signal.

2. The detection network of claim 1 wherein said data delimiters each include at least N bits and said storage means includes 2N data registers for sequentially storing 2N logical samples of said data waveform, said storage means being operative at a sampling rate of at least twice an instantaneous frequency of said data waveform.

3. The detection network of claim 2 wherein said boundary correction means includes a first logical gate array for monitoring a binary value within each of said registers, said first gate array being disposed to generate a first detection signal upon loading of said delimiter into said storage means.

4. The detection network of claim 3 wherein said boundary correction means includes a second logical gate array for monitoring the binary value within each of said registers, said second gate array being disposed to generate a second detection signal upon loading of a valid binary data pattern into said storage means.

5. The detection network of claim 4 wherein said boundary correction means includes an OR gate for generating a boundary detection signal upon generation of either said first or said second detection signal.

6. The detection network of claim 5 wherein said boundary correction means includes a boundary detection circuit for synthesizing said phase detection enable signal in phase synchronicity with said clock waveform upon receipt of said boundary detection signal.

7. The detection circuit of claim 3 wherein said binary data waveform include sequences of Manchester binary code and wherein said first gate array is configured to generate said first detection signal upon detecting a violation of said Manchester binary code within said delimiter.

8. The detection circuit of claim 7 wherein a set of said data registers have logical outputs denoted by symbols D0, D1, D2, D3, D4, D5, D6, D7, D8, D9, D10 and D11, respectively, and wherein said first gate array is disposed to generate said first detection signal upon detecting that:

D11=D10, D9=D8, D9=D10*, D6=D7*, D5=D4, D3=D2, D3=D4*, and D0=D1* with * denoting the symbol's logical complement.

9. The detection circuit of claim 8 wherein said second gate array is disposed to generate said second detection signal upon detecting that:

D0=D1*, D2=D3*, D4=D5*, D6=D7*, D8=D9* and D10=D11*, with * denoting the symbol's logical complement.

10. The detection circuit of claim 1 wherein said phase detector means includes a phase detector disposed to generate any component UP and a DOWN component of said phase error signal when addressed by said phase detection enable signal, said UP component being of a first duration proportional to an interval between a transition in said data waveform and a first transition in said clock waveform.

11. The detection circuit of claim 10 wherein each of said data registers includes a flip-flop in communication with another of said registers, and wherein said DOWN component is generated contemporaneously with said first clock transition and is of duration T/4.

12. In a phase-locked loop having a voltage controlled oscillator and a charge pump control network for supplying a control voltage thereto, a pattern independent phase detection network for providing a phase error signal to said control network in response to a phase difference between a data waveform of bit period T and a periodic clock waveform recovered from the binary data waveform, said data waveform having a plurality of data packets each separated by a data delimiter, comprising:

a storage means for storing samples of said data waveform;

a boundary correction means for generating a phase detection enable signal in response to said delimiter within said storage means; and phase detector means for comparing a relative phase between said data waveform and said periodic clock waveform upon generating said phase detection enable signal and for synthesizing said phase error signal.

13. The detection network of claim 12 wherein said data delimiters each include at least N bits and said storage means includes 2N data registers for sequentially storing 2N logical samples of said data waveform, said storage means being operative at a sampling rate of at least twice an instantaneous frequency of said data waveform.

14. The detection network of claim 13 wherein said boundary correction means includes a first combinational gate array for monitoring a binary value within each of said registers, said first gate array being disposed to generate a first detection signal upon the loading of said delimiter into said storage means.

15. The detection network of claim 14 wherein said boundary correction means includes a second combinational gate array for monitoring the binary value within each of said registers, said second gate array being disposed to generate a second detection signal upon loading of a valid binary data pattern into said storage means.

16. The detection network of claim 15 wherein said boundary correction means includes an OR gate for generating a boundary detection signal upon generation of either said first or said second detection signal.

17. The detection network of claim 16 wherein said boundary correction means includes a boundary detection circuit for synthesizing said phase detection enable signal in phase synchronicity with said clock waveform upon receipt of said boundary detection signal.

18. The detection circuit of claim 17 wherein said binary data waveform include sequences of Manchester binary code and wherein said first combinational gate array is configured to generate said first detection signal upon detecting a violation of said Manchester binary code within said delimiter.

19. The detection circuit of claim 18 wherein a set of said data registers have logical outputs denoted by symbols D0, D1, D2, D3, D4, D5, D6, D7, D8, D9, D10 and D11, respectively, and wherein said first gate array is disposed to generate said first detection signal upon detecting that:

D11=D10, D9=D8, D9=D10*, D6=D7*, D5=D4, D3=D2, D3=D4*, and D0=D1* with * denoting the symbol's logical complement.

20. The detection circuit of claim 19 wherein said second gate array is disposed to generate said second detection signal upon detecting that:

D0=D1*, D2=D3*, D4=D5*, D6=D7*, D8=D9* and D10=D11*, with * denoting the symbol's logical complement.

21. The detection circuit of claim 20 wherein said phase detector means includes a phase detector disposed to generate an UP component and a DOWN component of said phase error signal when addressed by said phase detection enable signal, said UP component being of a first duration proportional to an interval between a transition in said data waveform and a first transition in said clock waveform.

22. The detection circuit of claim 21 wherein each of said data registers includes a flip-flop in communication with another of said registers, and wherein said DOWN component is generated contemporaneously with said first clock transition and is of duration T/4.

23. A method for generating a phase error signal in response to a phase difference between a binary data waveform and a periodic clock waveform recovered from the binary data waveform, said data waveform having a plurality of data packets each separated by data delimiters, said method comprising the steps of:

a) sampling said data waveform at a rate of at least twice an instantaneous frequency of said periodic clock waveform to obtain a set of data samples;

b) storing said data samples;

c) generating a phase detection enable signal in response to storing a sampled representation of one of said delimiters; and d) comparing timing transitions in said clock and data waveforms and synthesizing said phase error in response thereto upon generating said phase detection enable signal.

24. The method of claim 23 wherein said delimiters each include at least N data bits and said step of storing includes step of sequentially loading the 2N samples of said data waveform into a storage means.

25. The method of claim 24 wherein said step of generating said enable signal includes the step of raising a first detection signal upon loading a sampled representation of one of said delimiters into said storage means and the step of raising a second detection signal upon loading a valid data pattern into said storage means.

26. The method of claim 25 wherein said step of generating said enable signal includes the step of issuing a boundary detection signal upon raising said first or said second detection signal.

27. The method of claim 26 wherein said step of generating includes the step of adjusting the phase of said enable signal in accordance with said boundary detection signal.

28. The phase detection network of claim 1 wherein said phase detector means includes a first detection module for generating first UP and DOWN components of said phase error signal, said first detection module being addressed by said data waveform.

29. The phase detection network of claim 28 wherein said phase detector means includes means for receiving complements of said data waveform, and further includes a second detection module addressed by one of said component or said data waveform for generating second UP and DOWN components of said phase error signal.

30. The phase detection network of claim 29 wherein said first and second detection modules are disposed to generate said first and second UP and DOWN components based on a phase difference between rising transitions in said periodic clock waveform, a complement of said clock, said binary data waveform and said complement of said data waveform.

31. A pattern independent phase detection network, for generating a phase error signal in response to a phase difference between a Manchester binary data waveform and a periodic clock waveform recovered from the binary data waveform, comprising:

storage means for storing samples of said data waveform;

boundary correction means for generating a phase detection enable signal in response to a valid Manchester data sequence within said storage means; and phase detector means for comparing a relative phase between said data waveform and said periodic clock waveform upon generating said phase detection enable signal, and for synthesizing said phase error signal.

32. The pattern independent phase detection network of claim 31 wherein said boundary correction means includes means for inhibiting generation of said phase detection enable signal in response to a Manchester all zero condition within said storage means.

* * * * *